United States Patent
Shirani-Mehr et al.

(10) Patent No.: US 9,655,107 B2
(45) Date of Patent: May 16, 2017

(54) SUBSPACE TRACKING IN FULL DIMENSION MIMO

(71) Applicant: Intel Corporation, Santa Clara, CA (US)

(72) Inventors: Hooman Shirani-Mehr, Portland, OR (US); Qinghua Li, San Ramon, CA (US); Yuan Zhu, Beijing (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/141,206

(22) Filed: Dec. 26, 2013

(65) Prior Publication Data
US 2015/0003543 A1    Jan. 1, 2015

(51) Int. Cl.
*H04W 88/02*    (2009.01)
*H04W 72/04*    (2009.01)
(Continued)

(52) U.S. Cl.
CPC ........ *H04W 72/0446* (2013.01); *H04B 7/024* (2013.01); *H04B 7/0452* (2013.01);
(Continued)

(58) Field of Classification Search
CPC ... H04B 1/38; H04B 7/02; H04B 7/04; H04K 1/10; H04L 1/02; H04L 5/00; H04L 5/04; H04L 25/03; H04L 25/49; H04L 27/28; H04W 4/00; H04W 24/10; H04W 72/04; H04W 88/02
(Continued)

(56) References Cited

U.S. PATENT DOCUMENTS

| 8,170,081 B2 | 5/2012 | Forenza et al. |
| 8,259,599 B2 * | 9/2012 | Ghady ................ H04B 7/0639 342/373 |

(Continued)

FOREIGN PATENT DOCUMENTS

| CN | 104254067 A | 12/2014 |
| CN | 105229934 A | 1/2016 |

(Continued)

OTHER PUBLICATIONS

"Circuit Switched (CS) fallback in Evolved Packet System (EPS); Stage 2", 3GPP TS 23.272 V11.5.0. Technical Specification Group Services and System Aspects. Release 11., (Jun. 2013), 95 pgs.

(Continued)

*Primary Examiner* — Shawkat M Ali
(74) *Attorney, Agent, or Firm* — Schwegman Lundberg & Woessner, P.A.

(57) ABSTRACT

Disclosed in some examples are methods, systems, devices, and machine readable mediums which reduce the amount of bandwidth consumed by the reference signals. In some examples, this is achieved by finding the optimal subspace containing all the active UEs in the cell and transmitting reference signals to that subspace. In some examples, second order statistics may be utilized to calculate a projected channel to the optimal subspace at the UE and then feeding this back to the eNodeB. The projected channel to optimal subspace may be utilized at the UE and the eNodeB to transform the codebook and align the codewords with the channel direction.

20 Claims, 7 Drawing Sheets

(51) Int. Cl.

| | |
|---|---|
| *H04W 76/02* | (2009.01) |
| *H04B 7/0452* | (2017.01) |
| *H04B 7/06* | (2006.01) |
| *H04W 56/00* | (2009.01) |
| *H04W 72/02* | (2009.01) |
| *H04L 25/02* | (2006.01) |
| *H04L 25/03* | (2006.01) |
| *H04W 16/14* | (2009.01) |
| *H04W 8/00* | (2009.01) |
| *H04W 48/16* | (2009.01) |
| *H04L 12/18* | (2006.01) |
| *H04W 74/00* | (2009.01) |
| *H04W 74/08* | (2009.01) |
| *H04W 36/02* | (2009.01) |
| *H04W 68/04* | (2009.01) |
| *H04W 76/06* | (2009.01) |
| *H04B 7/024* | (2017.01) |
| *H04J 11/00* | (2006.01) |
| *H04L 5/14* | (2006.01) |
| *H04W 84/18* | (2009.01) |
| *H04W 88/06* | (2009.01) |
| *H04W 84/04* | (2009.01) |

(52) U.S. Cl.
CPC ......... *H04B 7/0626* (2013.01); *H04J 11/005* (2013.01); *H04L 5/1469* (2013.01); *H04L 12/18* (2013.01); *H04L 25/021* (2013.01); *H04L 25/0242* (2013.01); *H04L 25/03891* (2013.01); *H04W 8/005* (2013.01); *H04W 16/14* (2013.01); *H04W 36/02* (2013.01); *H04W 48/16* (2013.01); *H04W 56/0005* (2013.01); *H04W 68/04* (2013.01); *H04W 72/02* (2013.01); *H04W 72/042* (2013.01); *H04W 74/004* (2013.01); *H04W 74/006* (2013.01); *H04W 74/0816* (2013.01); *H04W 76/02* (2013.01); *H04W 76/028* (2013.01); *H04W 76/06* (2013.01); *H04W 88/02* (2013.01); *H04W 72/0406* (2013.01); *H04W 84/045* (2013.01); *H04W 84/18* (2013.01); *H04W 88/06* (2013.01)

(58) Field of Classification Search
USPC ............... 370/203, 208, 252, 328, 329, 344; 375/219, 260, 267, 295, 316; 455/415; 704/223
See application file for complete search history.

(56) References Cited

U.S. PATENT DOCUMENTS

| | | | |
|---|---|---|---|
| 8,462,688 B1 | 6/2013 | Dinan | |
| 8,654,815 B1 | 2/2014 | Forenza et al. | |
| 8,992,202 B2 | 3/2015 | Pettis | |
| 9,025,479 B2 | 5/2015 | Gaal et al. | |
| 2004/0014501 A1 | 1/2004 | Kuwahara et al. | |
| 2006/0007043 A1 | 1/2006 | Xin | |
| 2007/0211813 A1* | 9/2007 | Talwar et al. | ............ 375/267 |
| 2008/0260918 A1 | 10/2008 | Lai et al. | |
| 2008/0305805 A1 | 12/2008 | Mondal et al. | |
| 2009/0323841 A1* | 12/2009 | Clerckx et al. | ............ 375/260 |
| 2010/0046643 A1 | 2/2010 | Mondal et al. | |
| 2010/0054237 A1 | 3/2010 | Han et al. | |
| 2010/0056216 A1 | 3/2010 | Li | |
| 2010/0265841 A1 | 10/2010 | Rong et al. | |
| 2010/0311431 A1 | 12/2010 | Papasakellariou et al. | |
| 2010/0316154 A1 | 12/2010 | Park et al. | |
| 2011/0069618 A1 | 3/2011 | Wong et al. | |
| 2011/0103305 A1 | 5/2011 | Ali et al. | |
| 2011/0149852 A1 | 6/2011 | Olsson et al. | |
| 2011/0164668 A1* | 7/2011 | Hoek | ............ H04B 7/0619 375/224 |
| 2011/0164696 A1* | 7/2011 | Choi et al. | ............ 375/260 |
| 2011/0194638 A1 | 8/2011 | Erell et al. | |
| 2011/0199986 A1 | 8/2011 | Fong et al. | |
| 2011/0216846 A1 | 9/2011 | Lee et al. | |
| 2011/0244847 A1* | 10/2011 | Mallik | ............ H04B 7/024 455/422.1 |
| 2011/0249637 A1 | 10/2011 | Hammarwall et al. | |
| 2011/0268101 A1 | 11/2011 | Wang et al. | |
| 2011/0275371 A1 | 11/2011 | Roger | |
| 2012/0014462 A1 | 1/2012 | Zummo et al. | |
| 2012/0071163 A1 | 3/2012 | Klingenbrunn et al. | |
| 2012/0082082 A1 | 4/2012 | Etemad et al. | |
| 2012/0128089 A1 | 5/2012 | Tsutsui | |
| 2012/0163235 A1 | 6/2012 | Ho et al. | |
| 2012/0165019 A1 | 6/2012 | Shintani et al. | |
| 2012/0252429 A1 | 10/2012 | Yoshizawa | |
| 2012/0275401 A1 | 11/2012 | Sun | |
| 2012/0281783 A1 | 11/2012 | Cheng et al. | |
| 2012/0322489 A1 | 12/2012 | Liu et al. | |
| 2013/0021925 A1* | 1/2013 | Yin et al. | ............ 370/252 |
| 2013/0034082 A1 | 2/2013 | Etemad et al. | |
| 2013/0039244 A1 | 2/2013 | Sun | |
| 2013/0064129 A1 | 3/2013 | Koivisto et al. | |
| 2013/0070703 A1 | 3/2013 | Yasukawa et al. | |
| 2013/0077513 A1 | 3/2013 | Ng et al. | |
| 2013/0083661 A1 | 4/2013 | Gupta et al. | |
| 2013/0083777 A1 | 4/2013 | Rydnell et al. | |
| 2013/0088983 A1 | 4/2013 | Pragada et al. | |
| 2013/0107849 A1* | 5/2013 | Park | ............ H04B 7/0417 370/329 |
| 2013/0107977 A1 | 5/2013 | Lakkis | |
| 2013/0114576 A1 | 5/2013 | Kwon et al. | |
| 2013/0121185 A1 | 5/2013 | Li et al. | |
| 2013/0155962 A1 | 6/2013 | Hakola et al. | |
| 2013/0157670 A1 | 6/2013 | Koskela et al. | |
| 2013/0163457 A1 | 6/2013 | Kim et al. | |
| 2013/0201852 A1 | 8/2013 | Chou et al. | |
| 2013/0230081 A1* | 9/2013 | Wernersson | ......... H04B 7/0617 375/219 |
| 2014/0024386 A1 | 1/2014 | Novak et al. | |
| 2014/0043630 A1 | 2/2014 | Buser et al. | |
| 2014/0050086 A1 | 2/2014 | Himayat et al. | |
| 2014/0056246 A1 | 2/2014 | Chun et al. | |
| 2014/0098900 A1 | 4/2014 | Bayesteh et al. | |
| 2014/0128092 A1 | 5/2014 | Xiong et al. | |
| 2014/0133401 A1 | 5/2014 | Kaura et al. | |
| 2014/0156646 A1 | 6/2014 | Brust et al. | |
| 2014/0171054 A1 | 6/2014 | Cai et al. | |
| 2014/0177683 A1 | 6/2014 | Krishnamurthy et al. | |
| 2014/0177744 A1 | 6/2014 | Krishnamurthy et al. | |
| 2014/0177745 A1 | 6/2014 | Krishnamurthy et al. | |
| 2014/0206367 A1 | 7/2014 | Agee et al. | |
| 2014/0211673 A1 | 7/2014 | Lu et al. | |
| 2014/0213259 A1 | 7/2014 | Teyeb et al. | |
| 2014/0286291 A1 | 9/2014 | Einhaus et al. | |
| 2014/0288699 A1 | 9/2014 | Williams et al. | |
| 2014/0321313 A1* | 10/2014 | Seo | ............ H04J 11/00 370/252 |
| 2014/0355562 A1 | 12/2014 | Gao et al. | |
| 2015/0003325 A1 | 1/2015 | Sajadieh et al. | |
| 2015/0003326 A1 | 1/2015 | Zaus | |
| 2015/0003338 A1 | 1/2015 | Xue et al. | |
| 2015/0004989 A1 | 1/2015 | Vannithamby et al. | |
| 2015/0004995 A1 | 1/2015 | Koc et al. | |
| 2015/0056993 A1 | 2/2015 | Zhu et al. | |
| 2015/0282029 A1 | 10/2015 | Faccin et al. | |
| 2015/0296354 A1 | 10/2015 | Liao et al. | |
| 2015/0372793 A1 | 12/2015 | Kang et al. | |
| 2015/0373736 A1 | 12/2015 | Ji et al. | |

FOREIGN PATENT DOCUMENTS

| | | |
|---|---|---|
| CN | 105229942 A | 1/2016 |
| CN | 105230053 A | 1/2016 |
| CN | 105247924 A | 1/2016 |
| CN | 105264788 A | 1/2016 |

(56) References Cited

FOREIGN PATENT DOCUMENTS

| | | |
|---|---|---|
| CN | 105284059 A | 1/2016 |
| EP | 2590336 A1 | 5/2013 |
| JP | 2011259263 A | 12/2012 |
| KR | 1020130021569 A | 3/2013 |
| KR | 1020130040749 A | 4/2013 |
| TW | 201316712 A | 4/2013 |
| TW | 201517660 A | 5/2015 |
| TW | 201635825 A | 10/2016 |
| WO | WO-2010043752 A1 | 4/2010 |
| WO | WO-2010088828 A1 | 8/2010 |
| WO | WO-2010150568 A1 | 12/2010 |
| WO | WO-2011138495 A1 | 11/2011 |
| WO | WO-2012000535 A1 | 1/2012 |
| WO | WO-2012125931 A1 | 9/2012 |
| WO | WO-2013012222 A2 | 1/2013 |
| WO | WO-2013081377 A1 | 6/2013 |
| WO | WO-2014158255 A1 | 10/2014 |
| WO | WO-2014209451 A1 | 12/2014 |
| WO | WO-2014210441 A1 | 12/2014 |
| WO | WO-2014210471 A1 | 12/2014 |
| WO | WO-2014210477 A1 | 12/2014 |
| WO | WO-2014210493 A1 | 12/2014 |
| WO | WO-2014210500 A1 | 12/2014 |

OTHER PUBLICATIONS

"Evolved Universal Terrestrial Radio Access (E-UTRA); Multiplexing and channel coding", ETSI TS 136 212 V11.3.0 (3GPP TS 36.212 version 11.3.0 Release 11). LTE., (Jul. 2013), 86 pgs.

"Evolved Universal Terrestrial Radio Access (E-UTRA); Multiplexing and channel coding", 3GPP TS 36.212 V12.0.0. Technical Specification Group Radio Access Network. Release 12., (Dec. 2013), 88 pgs.

"Evolved Universal Terrestrial Radio Access (E-UTRA); Physical channels and modulation", 3GPP TS 36.211 V12.0.0. Technical Specification Group Radio Access Network. Release 12., (Dec. 2013), 120 pgs.

"Evolved Universal Terrestrial Radio Access (E-UTRA); Physical channels and modulation", ETSI TS 136 211 v11.3.0 (3GPP TS 36.211 version 11.3.0 Release 11). LTE, (Jul. 2013), 110 pgs.

"Evolved Universal Terrestrial Radio Access (E-UTRA); Physical layer procedures", ETSI TS 136 213 V11.3.0 (3GPP TS 36.213 version 11.3.0 Release 11). LTE., (Jul. 2013), 178 pgs.

"Evolved Universal Terrestrial Radio Access (E-UTRA); Physical layer procedures", 3GPP TS 36.213 V12.0.0. Technical Specification Group Radio Access Network. Release 12., (Dec. 2013), 186 pgs.

"Evolved Universal Terrestrial Radio Access (E-UTRA); Study on Small Cell Enhancements for E-UTRA and E-UTRAN—Higher layer aspects", 3GPP TR 36.842 V1.0.0. Technical Specification Group Radio Access Network. Release 12., 69 pgs, Nov. 2013.

"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.

"General Packet Radio Service (GPRS); Service description; Stage 2", 3GPP TS 23.060 V12.1.0. Technical Specification Group Services and System Aspects. Release 12., (Jun. 2013), 338 pgs.

"IEEE Standard for Air Interface for Broadband Wireless Access Systems", IEEE Std 802.16. IEEE Computer Society. IEEE Microwave Theory and Techniques Society., (Aug. 17, 2012), 2544 pgs.

"IEEE Standard for Air Interface for Broadband Wireless Access Systems: Amendment 1: Enhancements to Support Machine-to-Machine Applications", IEEE Std 802.16p-2012. IEEE Computer Society. IEEE Microwave Theory and Techniques Society., (Oct. 8, 2012), 82 pgs.

"Mobile radio interface Layer 3 specification; Core network protocols; Stage 3", 3GPP TS 24.008 V12.2.0. Technical Specification Group Core Network and Terminals. Release 12., (Jun. 2013), 682 pgs.

"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.

"Part 11: Wireless LAN Medium Access Control (MAC) and Physical Layer (PHY) Specifications: Amendment 3: Enhancements for Very High Throughput in the 60 GHz Band", IEEE Std 802.11ad. Local and metropolitan area networks. IEEE Computer Society., (Dec. 28, 2012), 628 pgs.

Delmas, Jean P, "Chapter 4: Subspace Tracking for Signal Processing", Adaptive Signal Processing: Next Geneartion Solutions, John Wiley & Sons, Inc., (Jun. 16, 2010), 211-270.

Shirani-Mehr, Hooman, et al., "Practical Downlink Transmission Schemes for Future LTE Systems with Many Base-Station Antennas", IEEE Globecom, (2013), 5 pgs.

Yang, Bang, "Projection approximation subspace tracking", IEEE Transactions on Signal Processing, 43(1), (Jan. 1995), 95-107.

"U.S. Appl. No. 14/136,554, Non Final Office Action mailed Mar. 17, 2015", 11 pgs.

"U.S. Appl. No. 14/141,223, Non Final Office Action mailed Apr. 14, 2015", 18 pgs.

"Clarification on the scope of ISRP Filter Rule priority", LG Electronics, S2-115168, 3GPP TSG-SA2 Meeting #88, (Nov. 2011), 1-4.

"European Application Serial No. 14171648.0, Extended European Search Report mailed Dec. 22, 2014", 7 pgs.

"International Application Serial No. PCT/US2014/031996, International Search Report mailed Aug. 26, 2014", 3 pgs.

"International Application Serial No. PCT/US2014/031996, Written Opinion mailed Aug. 26, 2014", 4 pgs.

"International Application Serial No. PCT/US2014/044540, International Search Report mailed Oct. 15, 2014", 3 pgs.

"International Application Serial No. PCT/US2014/044540, Written Opinion mailed Oct. 15, 2014", 6 pgs.

"International Application Serial No. PCT/US2014/044592, International Search Report mailed Sep. 29, 2014", 3 pgs.

"International Application Serial No. PCT/US2014/044592, Written Opinion mailed Sep. 29, 2014", 5 pgs.

"International Application Serial No. PCT/US2014/044606, International Search Report mailed Oct. 22, 2014", 3 pgs.

"International Application Serial No. PCT/US2014/044606, Written Opinion mailed Oct. 22, 2014", 6 pgs.

"International Application Serial No. PCT/US2014/044626, International Search Report mailed Oct. 22, 2014", 3 pgs.

"International Application Serial No. PCT/US2014/044626, Written Opinion mailed Oct. 22, 2014", 5 pgs.

"International Application Serial No. PCT/US2014/044640, International Search Report mailed Oct. 21, 2014", 4 pgs.

"International Application Serial No. PCT/US2014/044640, Written Opinion mailed Oct. 21, 2014", 6 pgs.

"U.S. Appl. No. 14/133,215, Non Final Office Action mailed Oct. 8, 2015", 15 pgs.

"U.S. Appl. No. 14/136,554, Final Office Action mailed Sep. 21, 2015", 12 pgs.

"U.S. Appl. No. 14/141,067,Response filed Oct. 8, 2015 Non Final Office Action mailed Jul. 8, 2015", 9 pgs.

"U.S. Appl. No. 14/141,223, Final Office Action mailed Oct. 7, 2015", 19 pgs.

"European Application Serial No. 14171648.0, Response filed Jul. 17, 2015 Extended European Search Report mailed Dec. 22, 2014", 8 pgs.

"Taiwanese Application Serial No. 103120032, Office Action mailed Sep. 23, 2015", W/ English Translation, 14 pgs.

"U.S. Appl. No. 14/136,554, Response filed Jun. 17, 2015 to Non Final Office Action mailed Mar. 17, 2015", 6 pgs.

"U.S. Appl. No. 14/141,067, Non Final Office Action mailed Jul. 8, 2015", 9 pgs.

"U.S. Appl. No. 14/141,223, Response filed Aug. 12, 2015 to Non Final Office Action mailed Apr. 14, 2015", 11 pgs.

U.S. Appl. No. 14/778,528, filed Sep. 18, 2015, User Equipment and Method for Resource Allocation and Device-to-Device Discovery Hopping.

(56) References Cited

OTHER PUBLICATIONS

"U.S. Appl. No. 14/109,211, Non Final Office Action mailed Dec. 14, 2015", 15 pgs.
"U.S. Appl. No. 14/133,215, Non Final Office Action mailed Feb. 2, 2016", 25 pgs.
"U.S. Appl. No. 14/136,554, Advisory Action mailed Dec. 8, 2015", 3 pgs.
"U.S. Appl. No. 14/136,554, Examiner Interview Summary mailed Dec. 1, 2015", 3 pgs.
"U.S. Appl. No. 14/136,554, Response filed Nov. 24, 2015 to Final Office Action mailed Sep. 21, 2015", 6 pgs.
"U.S. Appl. No. 14/141,067, Notice of Allowance mailed Dec. 10, 2015", 9 pgs.
"U.S. Appl. No. 14/141,223, Advisory Action mailed Dec. 11, 2015", 4 pgs.
"U.S. Appl. No. 14/141,223, Examiner Interview Summary mailed Dec. 2, 2015", 3 pgs.
"U.S. Appl. No. 14/141,223, Response filed Dec. 2, 2015 to Final Office Action mailed Oct. 7, 2015", 8 pgs.
"U.S. Appl. No. 14/990,054, Preliminary Amendment filed Jan. 11, 2016", 7 pgs.
"International Application Serial No. PCT/US2014/031996, International Preliminary Report on Patentability mailed Jan. 7, 2016", 6 pgs.
"International Application Serial No. PCT/US2014/044540, International Preliminary Report on Patentability mailed Jan. 7, 2016", 8 pgs.
"International Application Serial No. PCT/US2014/044592, International Preliminary Report on Patentability mailed Jan. 7, 2016", 7 pgs.
"International Application Serial No. PCT/US2014/044606, International Preliminary Report on Patentability mailed Jan. 7, 2016", 16 pgs.
"International Application Serial No. PCT/US2014/044626, International Preliminary Report on Patentability mailed Jan. 7, 2016", 7 pgs.
"International Application Serial No. PCT/US2014/044640, International Preliminary Report on Patentability mailed Jan. 7, 2016", 8 pgs.
"Taiwanese Application Serial No. 103120032, Response filed Dec. 16, 2015 to Office Action mailed Sep. 23, 2015", W/ English Claims, 17 pgs.
"Taiwanese Application Serial No. 103121919, Office Action mailed Dec. 17, 2015", W/ English Search Report, 10 pgs.
U.S. Appl. No. 14/990,054, filed Jan. 7, 2016, Resuming Packet Services in a Mobile Network.
"U.S. Appl. No. 14/109,211, Advisory Action mailed Aug. 22, 2016", 5 pgs.
"U.S. Appl. No. 14/109,211, Non Final Office Action mailed Sep. 28, 2016", 18 pgs.
"U.S. Appl. No. 14/109,211, Response filed Aug. 5, 2016 to Final Office Action mailed Jun. 10, 2016", 9 pgs.
"U.S. Appl. No. 14/109,211, Response filed Sep. 12, 2016 to Advisory Action mailed Aug. 22, 2016", 9 pgs.
"U.S. Appl. No. 14/133,215, Advisory Action mailed Aug. 4, 2016", 3 pgs.
"Correction of ISR description for CSFB with suspended PS bearers", 3GPP Draft; S2-104673 23401 R10 ISR in CSFB V3, 3rd Generation Partnership Project (3GPP). Mobile Competence Centre; 650. Route Des Lucioles; F-06921 Sophia-Antipolis Cedex; France, vol. Sa WG2. No. Prague, (Oct. 2010), 4 pgs.
"Correlation based explicit feedback", Alcatel-Lucent Shanghai Bell et al: 3GPP Ri-100719, 3rd Generation Partnership Project (3GPP), Mobile Competence Centre; 650, Route Deslucioles; F-06921 Sophia-Antipolis Cedex; France, (Jan. 13, 2010), 12 pgs.
"European Application Serial No. 14816958.4, Extended European Search Report mailed Feb. 3, 2017", 11 pgs.
"European Application Serial No. 14817214.1, Extended European Search Report mailed Dec. 23, 2016", 9 pgs.

"European Application Serial No. 14817448.5, Partial Supplementary European Search Report mailed Feb. 16, 2017", 11 pgs.
"European Application Serial No. 14817851.0, Extended European Search Report mailed Mar. 2, 2017", 11 pgs.
"European Application Serial No. 14818323.9, Extended European Search Report mailed Feb. 23, 2017", 10 pgs.
"Evaluation of enhanced MIMO feedbacks for LTE-A", Intel Corporation (UK) Ltd: 3GPP Draft; R1-101808_Feedback, 3rd Generation Partnership Project (3GPP), Mobile Competence Centre; 650, Route Des Lucioles; F-06921 Sophia-Antipolis Cedex; France, (Apr. 6, 2010), 1-3,5.
"Evaluation results for feedback enhancement (Scenario A and C)", LG Electronics: 3GPP Draft; Ri-114351 LG Evaluation Results SCNAC, 3rd Generation Partnership Project (3GPP), Mobile Competence Centre; 650, Route Des Lucioles; F06921 Sophia-Antipolis Cedex; France, vol. RAN WG1, No. San Francisco, USA, (Nov. 21, 2011), 8 pgs.
"Generalized Transformation for adaptive codebooks", Samsung: 3GPP Draft; Ri-102204 Adaptive Codebook REV1, 3rd Generation Partnership Project I3GPP), Mobile Competence Centre 650, Route Deslucioles; F-06921 Sophia-Antipolis Cedex; France, vol. RAN WG1, No. Beijing, China;, (Apr. 6, 2010), 10 pgs.
"Japanese Application Serial No. 2016-521919, Office Action mailed Jan. 31, 2017", W/ English Translation, 4 pgs.
"Korean Application Serial No. 10-2015-7033288, Response filed Feb. 1, 2017 to Office Action mailed Dec. 1, 2016", 14 pgs.
"On the remaining aspects of PMI and RI reporting accuracy tests fo r eDL-Mimo", Incorporated: 3GPP Draft; R4-114211, 3rd Generation Partnership Project (3GPP), Mobile Competence Centre; 650, Route Deslucioles; F-06921 Sophia-Antipolis Cedex; France, vol. RAN WG4, No. Athens, Greece, (Aug. 17, 2011), 4 pgs.
"RA update after Cell Change Order (CCO) to GERAN", 3GPP Draft; S2-123292 WASS2-122780 RA Update After Cell Change Order (CCO) to GERAN. 3rd Generation Partnership Project (3GPP). Mobile Competence Centre; 650. Route Des Lucioles; F-06921 Sophia-Anti, vol. SA WG2. No. Barcelona. Spain, Retrieved from the Internet: <URL:http://www.3gpp.org/ftpjtsg sajWG2 Arch/TSGS2 92 Barcelona/Docs/> [retrieved-on Jul. 7, 2012], (Jul. 2012), 3 pgs.
"Reply LS on UE's inconsistent behaviour when PS Back-off timer is running", 3GPP TSG-T WG1?83 C1-131808, [Online] retrieved from the internet: <http://www.3gpp.org/ftp/tsg_ct/WG1_mm-cc-sm_ex-CN1/TSGC1_83_Chengdu/docs/C1-131808.zip, (May 2, 2013)
"SU/MU MIMO Feedback with Codebook-based Vector Quantization", Samsung: 3GPP Draft; RI-094322 SUMU MIMO Feedback With Codebook-Based Vector Quantization, 3rd Generation Partnership Project (3GPP), Mobile Competence Centre; 650, Route Des Lucioles; F-06921 Sophia-Antipolis Cedex; France, (Oct. 7, 2009), 9 pgs.
"Taiwanese Application Serial No. 105119738, Office Action mailed Jan. 24, 2017", (English Translation), 23 pgs.
"Techniques for D2D Discovery", R1-132503, 3GPP TSG RAN WG1 Meeting #73, (May 2013), 1-7.
Alcatel-Lucent, et al., "Grid of beams for MU-MIMO", 3GPP Draft; R1-100421 GOB, 3rd Generation Partnership Project (3GPP), Mobile Competence Centre; 650, Route Deslucioles; F-06921 Sophia-Antipolis Cedex; France, vol. RAN WG1, no. Valencia, Spain, (Jan. 12, 2010), 6 pgs.
Alcatel-Lucent, Shanghai Bell, et al, "Considerations on CSI feedback fo r high-priority antenna configurations", 3GPP Draft; Ri-112420 Considerations on CSI Feedback Enhancements for High-Priority Antenna CONFIGURAT10NS_clean, 3rd Generation Partnership Project (3GPP), Mobile Competence Centre; 650 Route Deslucioles, (Aug. 18, 2011), 7 pgs.
NTT Docomo, "Initial Views on Unified Approach for D2D Discovery", 3GPP Draft; R1-132371 D2D Discovery Unified. 3rd Generation Partnership Project (3GPP), Retrieved from the Internet: <URL:http://www.3gpp.org/ftpjtsa ran/WG1 RL1/TSGR173/Docs/ >, (May 11, 2013), 7 pgs.

* cited by examiner

SUBSPACE TRACKING IN FULL DIMENSION MIMO

PRIORITY CLAIM

This patent application claims the benefit of priority, under 35 U.S.C. Section 119 to U.S. Provisional Patent Application Ser. No. 61/841,230, entitled "ADVANCED WIRELESS COMMUNICATION SYSTEMS AND TECHNIQUES," filed on Jun. 28, 2013, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

TECHNICAL FIELD

Embodiments pertain to wireless communication systems. Some embodiments relate to systems, methods, devices, and machine readable mediums for Multiple Input, Multiple Output (MIMO) wireless communication systems.

BACKGROUND

Modern cellular telecommunications systems utilize a base station which communicates with a mobile device such as a cellular telephone. In some examples, the air interface between the base station and the mobile device may utilize a method to encode data. Example methods include an Orthogonal Frequency Division Multiplexing (OFDM) method a Wideband Code Division Multiple Access (W-CDMA), and the like.

Advanced wireless systems may utilize Multiple Input, Multiple Output (MIMO) techniques in which multiple transmit and multiple receive antennas are used to create separate spatial streams which take advantage of a multipath environment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

One example OFDM MIMO wireless network is a Long Term Evolution (LTE) wireless network. The specification for LTE is maintained by the Third Generation Partnership Project (3GPP). In LTE the base station is called an enhanced Node B (eNodeB) and the mobile is called a User Equipment (UE). One of the items for study in LTE Release 12 is the utilization of Full dimension MIMO (FD-MIMO). In FD-MIMO systems, the eNodeB, has a large number of antennas (e.g., greater than or equal to eight) for beam-forming separate spatial streams to UEs. In Frequency Division Duplex (FDD) mode in which the uplink and downlink channels of the air interface between the eNodeB and the UE are separated by frequency, downlink channel information is required at the eNodeB in order to enable beam-forming downlink data to the UE. This channel information may be obtained at the eNodeB by transmitting reference signals from the eNodeB to the UEs. The UE's may then utilize the reference signals to measure the downlink channel. Based upon these measurements, the UE may quantize both the channel direction and amplitude and send these measurements back to the eNodeB.

In current LTE systems, the overhead for these reference signals increases linearly with the number of antennas. With systems that have a large number of antennas, such as FD-MIMO, this overhead becomes prohibitive.

Disclosed in some examples are methods, systems, devices, and machine readable mediums which reduce the amount of overhead associated with these reference signals. In some examples, this is achieved by finding the optimal subspace containing all the active UEs in the cell and transmitting reference signals to only that subspace. In some examples, the UE may utilize second order statistics to calculate a projected channel to the optimal subspace. The UE may then feed this back to the eNodeB. The projected channel to optimal subspace may be utilized at the UE and the eNodeB to transform the codebook and align the codewords with the channel direction. This reduces the quantization error in channel direction quantization and consequently, improves system performance.

The dimension of the full space can go up to the number of antennas at the eNodeB, which can be very large. In reality, within this full space, the signals sent by the eNodeB can only reach a handful of active UEs via a handful of beamforming directions while other beamforming directions are useless and cause interference. Given that the useful beamforming directions are limited, the channel training resources—e.g., the Channel State Information-Reference Signal (CSI-RS) may be deployed only around those directions for lower overhead and higher efficiency. This can be done by beamforming the channel training signals to the signal subspace spanned by all the active UEs or part of the active UEs. As the dimension of the signal subspace is mainly determined by the number of active UEs, the required number of training resources, e.g., antenna ports, is small.

For beamforming the channel training signals (e.g., the CSI-RS) to the UEs, the beamforming directions need to be known. These directions can be estimated from the previous UE channel state feedback. For example, the signal subspace can be computed from the singular value decomposition of the matrix formed by the fed back beam-forming vectors. Note that as the mobile channel varies over time, the UE may move out from the initial beam-forming direction. To address this, in some examples the eNodeB may regularly track channel variations.

During an initial training phase, the downlink (DL) channels of the UEs in one cell are estimated at each UE. The estimated DL channels for the active UEs are then fed back to the eNodeB where they are collected. Next, the optimal subspace containing almost all the energy of those channels is calculated. This information is then used to optimize future DL training and reduce signal overhead by scanning part of that optimal subspace constantly and the rest of the subspace occasionally (to capture sudden changes in the DL channel of the UEs).

System Model

The channel from the eNodeB to $UE^k$ in OFDM symbol t and subcarrier n can be expressed as:

$$H_k[n,t] = \sum_{m=1}^{M} h_{k,m}[n,t]e_m = \sum_{m=1}^{M} g_{k,m}[n,t]w_m$$

where $e_m=(0,0,\ldots,0,1,0,0,\ldots,0)^T$ with 1 in the m-th position and zeroes elsewhere and $w_m$ vectors are unit-norm and orthogonal. In order to compress the channel and reduce dimensionality from M to D<M, one has to find the optimal basis $w_1, \ldots, w_M$ such that, $g_{k,m}[n] \approx 0$ when m>D. Then, for $d=1,2,\ldots,D$, coefficients $g_{k,m}[n,t]$ are given by $g_{k,d}[n,t] = w_d^H H_k[n,t]$.

Beamforming Reference Signal at the eNodeB

From the above, it is clear that, instead of utilizing M reference signals to estimate the channel in the original M-dimensional space and feeding back that information, the eNodeB can only employ D reference signals. By beamforming these reference signals with $w_1, \ldots, w_D$, each UE can estimate the coefficient $g_{k,d}[n]$ directly and send that information to the eNodeB. By utilizing this approach, the amount of overhead is reduced by a factor of D/M. Moreover, as UEs don't need to know the beamforming vectors, this process is totally transparent to the UEs. In order to obtain the optimal subspace for each cell, the channel covariance matrix is estimated at the end of the q-th training phase as:

$$R_q \approx \frac{1}{KTN} \sum_{k=1}^{K} \sum_{t=(q-1)T+1}^{qT} \sum_{n=1}^{N} \left(\frac{\hat{H}_{k[t,n]}}{\|\hat{H}_k[t,n]\|}\right)\left(\frac{\hat{H}_{k[t,n]}}{\|\hat{H}_k[t,n]\|}\right)^H = U_q \Lambda_q U_q^H$$

Where T is the length of the training period for sample covariance matrix calculation at the eNodeB in terms of OFDM symbols, $U_q$ is an M×M unitary matrix and $\Lambda_q$ is a diagonal matrix of eigenvalues $\lambda_{q,1}, \ldots, \lambda_{q,D}$. Assume that $\lambda_{q,1} \geq \ldots \geq \lambda_{q,D} \geq \lambda_{D+1} \approx \ldots \approx \lambda_M \approx 0$. Then, the basis of the optimal D dimension subspace will be $\{u_{q,1}, \ldots, u_{q,D}\}$ where $u_{q,d}$ is the d-th column of $U_q$, i.e., the eigenvector corresponding to the d-th strongest eigenvalue.

As discussed previously, vectors $\{u_{q,1}, \ldots, u_{q,D}\}$ can be used to beam-form reference signals. However, as mentioned before, in order to track sudden changes in the channel and the cases that the channel may be outside this subspace, the eNodeB may occasionally scan other directions orthogonal to the D-dimension optimal subspace, i.e., $u_{q,D+1}, \ldots, u_{q,M}$. Therefore, during reference signal transmission, the eNodeB may always beam-form D-r reference signals with $u_{q,1}, \ldots, u_{q,D-r}$ and the remaining r reference signals are beam-formed with r vectors selected out of $u_{q,D-r+1}, \ldots, u_{q,M}$ in order to cover the rest of the M-dimension space.

Channel State Information at the UE

Figure 1:
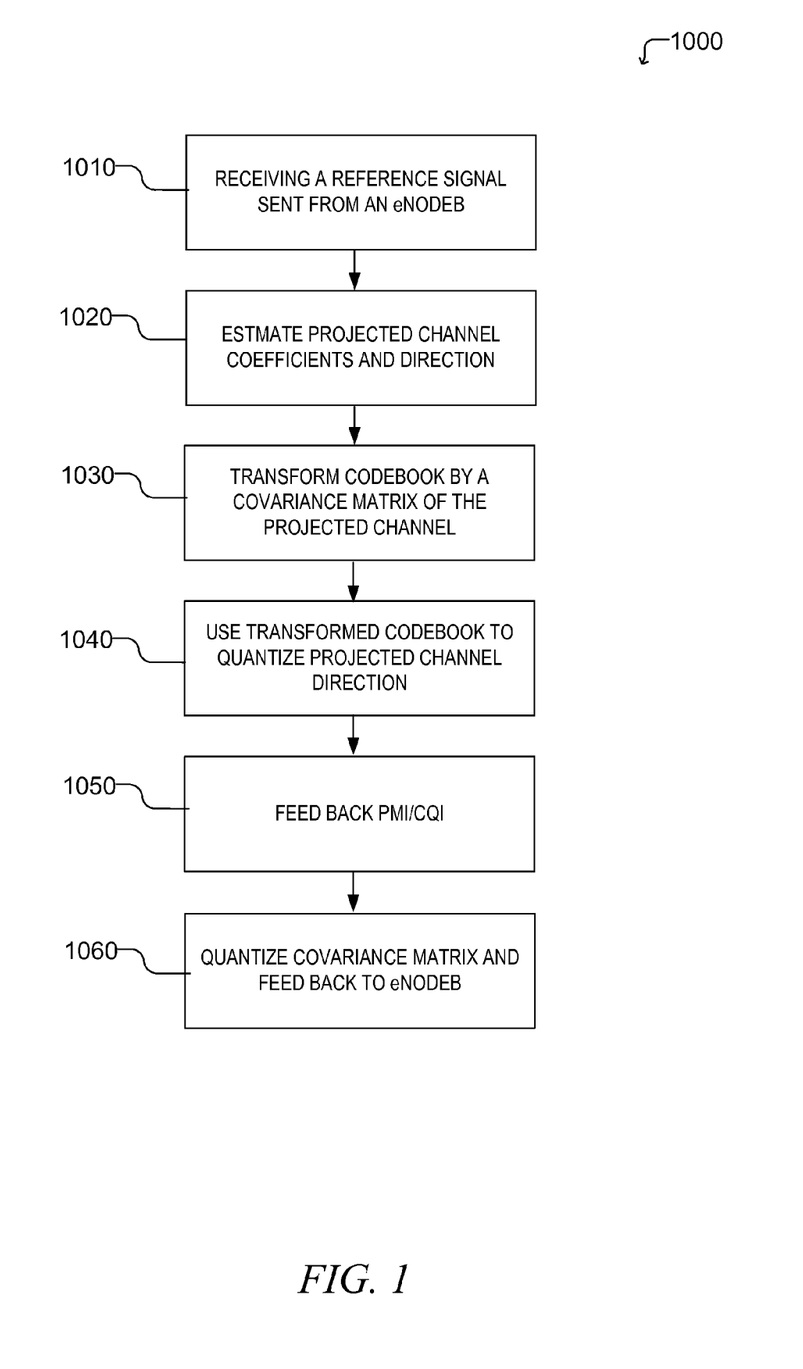
FIG. 1 shows a flowchart of a method of processing beamformed channel state information at the UE.

Turning now to FIG. 1 a flowchart of a method 1000 of processing beamformed channel state information at the UE is shown according to some examples. The UE receives the beamformed reference signals at operation 1010.

After receiving beam-formed reference signals, each UE estimates projected channel coefficients in the new space at operation 1020 as:

$$\hat{g}_{k,d}[n,t] = u_{q,d}^H \hat{H}_k[n,t], d=1,2,\ldots,D$$

Then, the projected channel direction is obtained as:

$$\tilde{g}_k[n,t] = \frac{[\hat{g}_{k,1}[n,t], \ldots, \hat{g}_{k,D}[n,t]]^T}{\|[\hat{g}_{k,1}[n,t], \ldots, \hat{g}_{k,D}[n,t]]^T\|}$$

At operation 1030, in order to quantize this direction, each UE transforms its codebook (3GPP LTE codebook or any other codebook) by the covariance matrix of the "projected" channel given by:

$$R'_k = \sum \left([\hat{g}_{k,1}[n,t], \ldots, \hat{g}_{k,D}[n,t]]^T\right)\left([\hat{g}_{k,1}[n,t], \ldots, \hat{g}_{k,D}[n,t]]^T\right)^H$$

Figure 2:
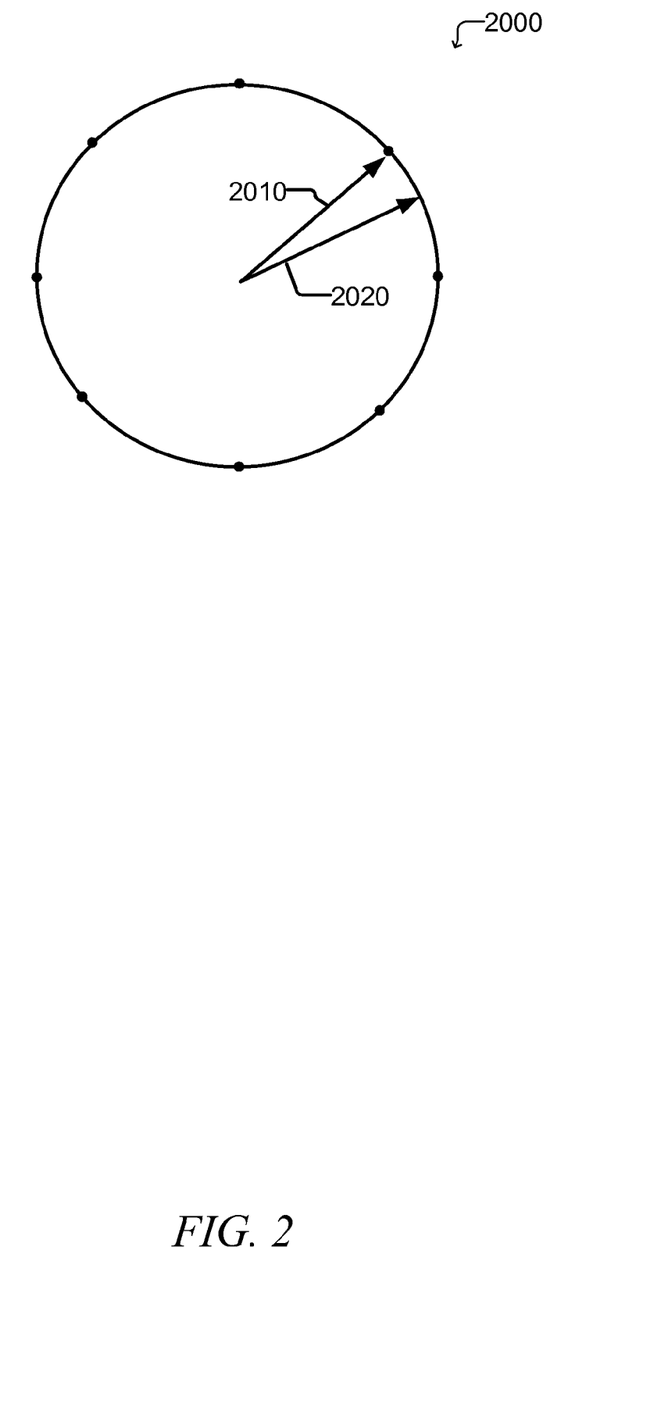
FIG. 2 is a diagram of codewords before a transform according to some examples of the present disclosure.
Figure 3:
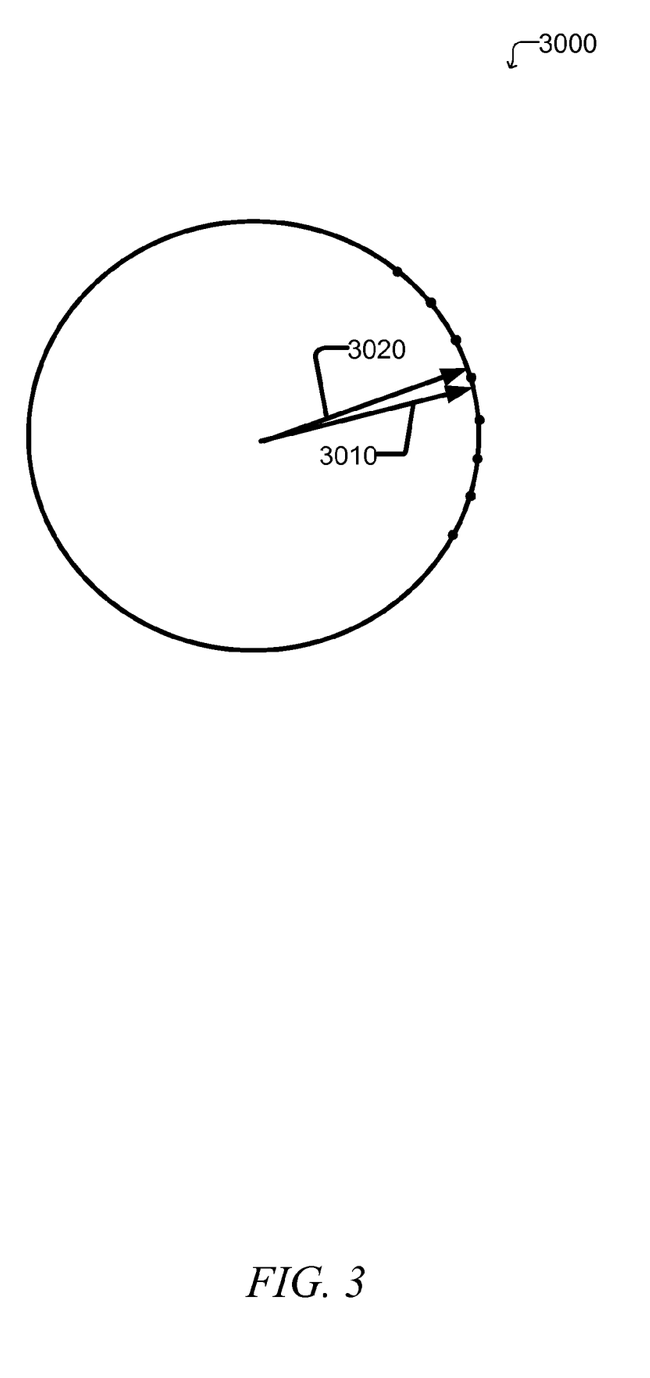
FIG. 3 is a diagram of codewords after a transform according to some examples of the present disclosure.

The new codewords are hence given as:

$$c'_{k,i} = \frac{R'_k c_{k,i}}{\|R'_k c_{k,i}\|}$$

Where $c_i$s and $c_i'$'s are codewords before and after transform respectively. FIG. 2 illustrates codewords before the transform and FIG. 3 shows code words after the transform. Arrows 2010 and 3010 show the direction of projected channel and arrows 2020 and 3020 represent the quantized projected channel direction. Each UE calculates its transform codebook at operation 1030 and uses that to quantize the projected channel direction at operation 1040. This can be done for example by maximizing the inner product as $$\max_{all\ i} \langle c'_{k,i}, \tilde{g}_k[n,t] \rangle$$

In other examples, this may be done based on maximizing capacity and the like. The index of the optimal codeword is sent to the eNodeB (precoding matrix indicator (PMI)) along with a Channel Quality Indicator (CQI—representing SINR) to enable eNB to reconstruct the channel at operation 1050.

Note that, as covariance matrix $R_k'$ is UE-dependent and unknown at the eNodeB, each UE has to quantize this matrix. This can be done in different ways for example by scalar quantization of its elements. After quantization, each UE feeds back its own covariance matrix to the eNodeB at operation 1060. This introduces some additional overhead to the system. However, this overhead can be reduced by exploiting the structure of covariance matrix for example by only quantizing and feeding back upper or lower triangular elements of the matrix. Moreover, the second order statistics of the channel vary in a much slower rate comparing to the instantaneous channel itself. Therefore, this additional feedback can be sent much less frequently than compared to PMI and CQI.

Figure 4:
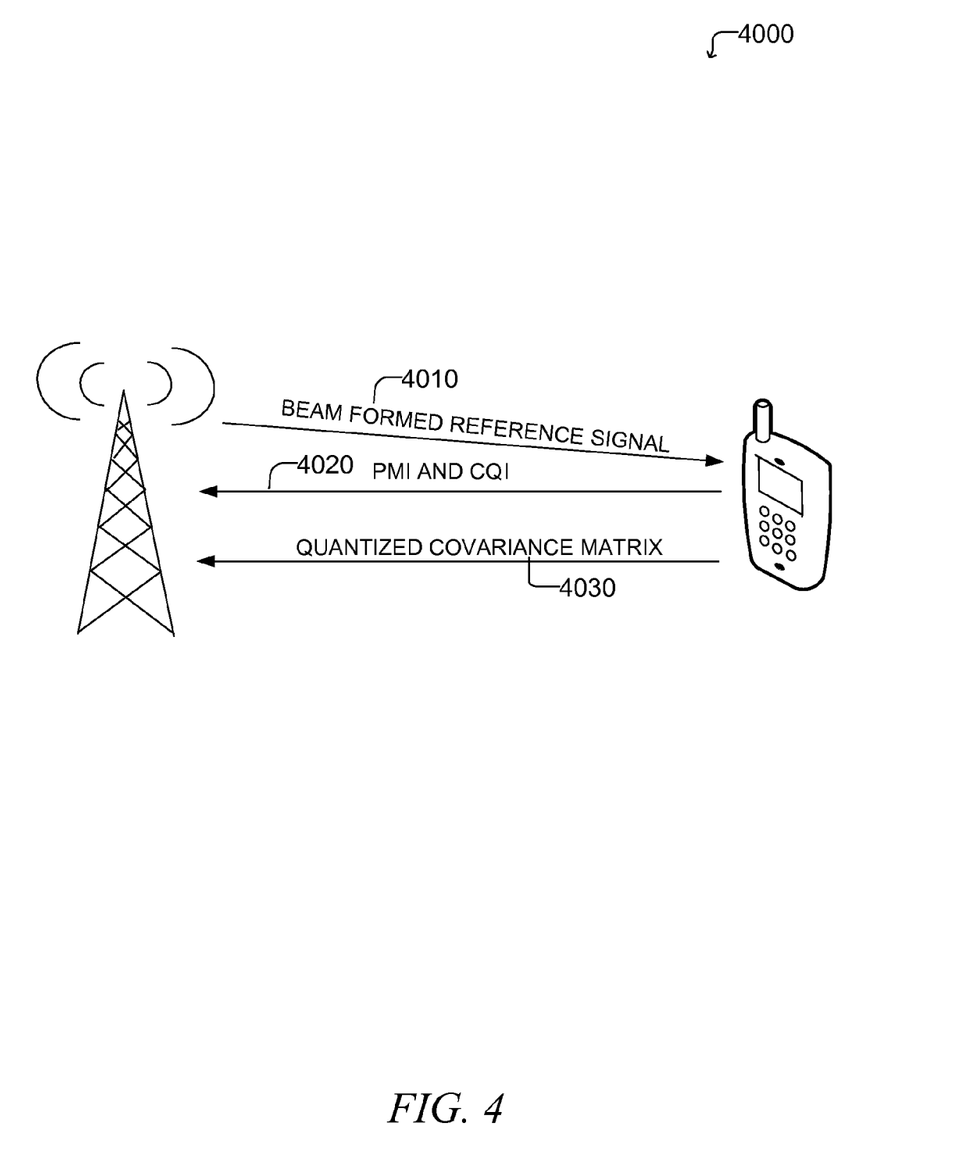
FIG. 4 shows a flowchart of signals transmitted to and from the UE and eNodeB according to some examples of the present disclosure.

FIG. 4 shows a flowchart of signals transmitted to and from the UE and eNodeB 4000 according to some examples of the present disclosure. At operation 4010, the eNodeB transmits a beamformed reference signal. The mobile device calculates the PMI and CQI. At operation 4020, the UE sends the PMI and CQI to the eNodeB. At operation 4030, the UE sends the quantized covariance matrix to the eNodeB to reconstruct the channel. In some examples, operation 4030 may happen at various times (e.g., not necessary directly after the PMI and CQI are calculated and transmitted).

Channel Reconstruction at the eNodeB

The eNodeB reconstructs the channel in the original M dimension space as:

$$\hat{H}_k[t,n] \approx \sqrt{SINR_k[t,n]} \sum_{d=1}^{D-1} \hat{g}_{k,d}[n,t] u_{q,d}$$

Figure 5:
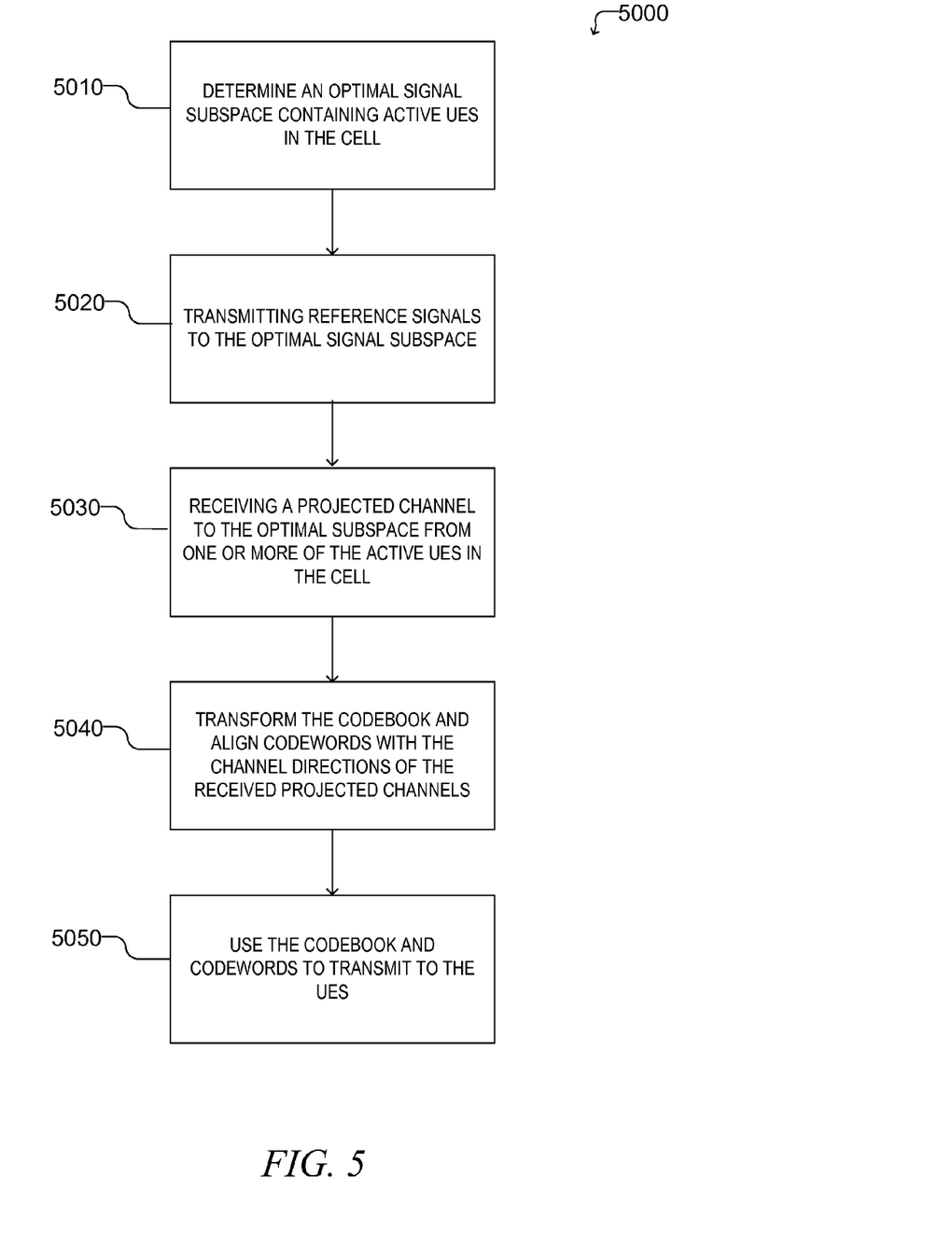
FIG. 5, shows a flowchart of a method of beamforming reference signals to a UE is shown according to some examples of the present disclosure.

Turning now to FIG. 5, a flowchart of a method 5000 of beamforming reference signals to a UE is shown according to some examples of the present disclosure. At operation 5010 the optimal signal subspace is computed. This may be based upon previous reference signals sent by UEs. At operation 5020, the reference signals are beam-formed to the optimal signal subspace. At operation 5030, projected channels to the optimal subspace is feedback from the UEs. At operation 5040, this fed-back information is used by the eNodeB to transform the codebook and align the codewords with the channel directions of the received projected channels. At operation 5050, the codebook and codewords are utilized to transmit to the UEs.

Figure 6:
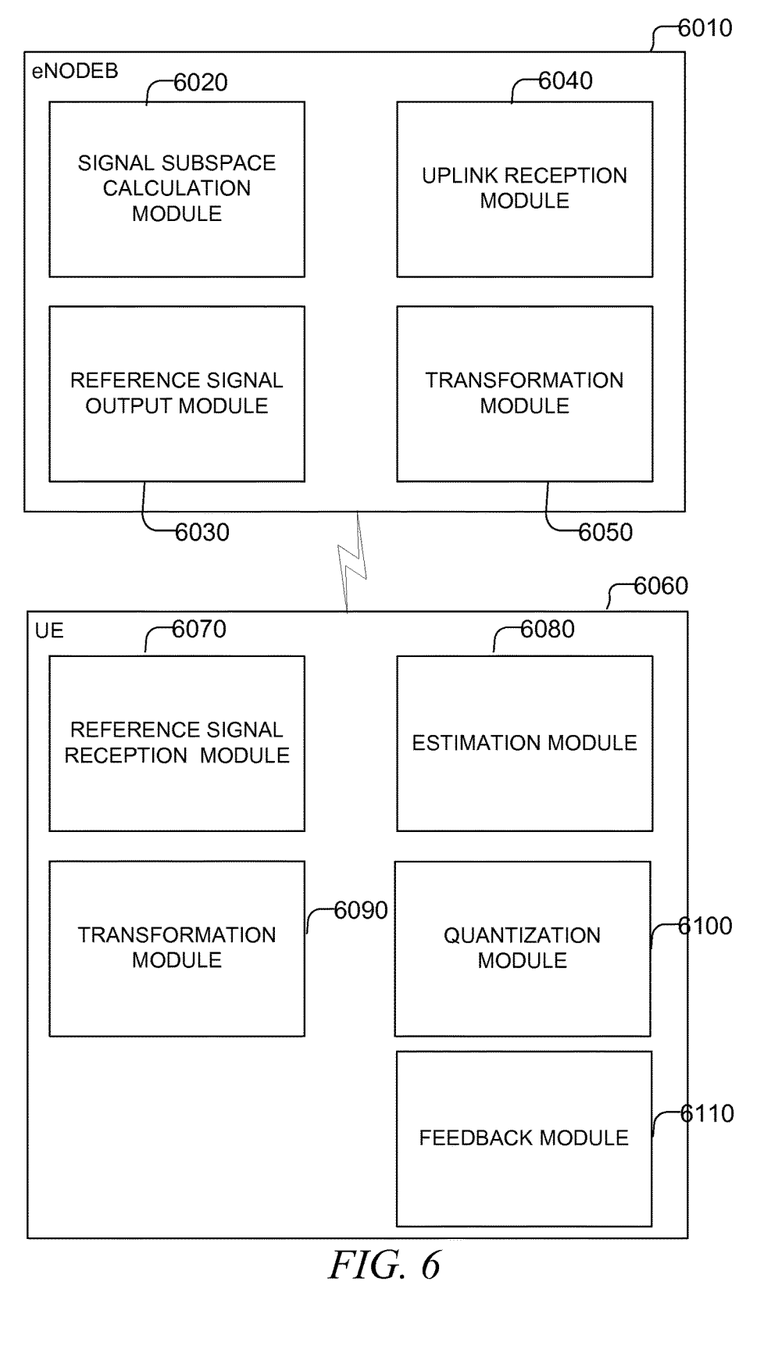
FIG. 6, shows a block schematic of an eNodeB and UE according to some examples of the present disclosure.

Turning now to FIG. 6, a block schematic of an eNodeB 6010 and UE 6060 according to some examples of the present disclosure is shown. eNodeB 6010 includes a signal subspace calculation module 6020 to determine an optimal signal subspace containing active UEs in the cell. eNodeB 6010 includes a reference signal output module 6030 configured to transmit beam formed reference signals to the optimal signal subspace. eNodeB 6010 includes an uplink reception module 6040 configured to receive a projected channel to the optimal signal subspace from one or more of the active UEs in the cell. eNodeB also includes a transformation module 6050 configured to transform a codebook and align codewords with a channel direction of the received projected channel.

UE 6060 may include a reference signal reception module 6070 configured to receive a beam formed reference signal sent from an eNodeB. UE 6060 may include an estimation module 6080 configured to estimate projected channel coefficients and direction. UE 6060 may also include a transformation module 6090 configured to transform a codebook by a covariance matrix of the projected channel coefficients and direction. UE 6060 may also include a quantization module 6100 configured to quantize the projected channel direction. UE 6060 may also include a feedback module 6110 configured to calculate a precoding matrix indicator and a channel quality indicator based upon the covariance matrix as well as transmit the precoding matrix indicator, and a quantized covariance matrix calculated from the covariance matrix to the eNodeB.

UE 6060 and eNodeB 6010 may contain other modules not shown to provide additional functionality. Furthermore, the modules shown in FIG. 6 are exemplary and may provide additional functionality. Additionally, one of ordinary skill in the art with the benefit of Applicants' disclosure will appreciate that the functionality of the modules may be organized differently than shown and described with respect to FIG. 6.

While examples herein were illustrated in practice with an LTE system, one of ordinary skill in the art with the benefit of Applicants' disclosure will note the applicability of the techniques to other advanced wireless systems that utilized channel state feedback with MIMO. Other example systems may include, the Institute for Electronics and Electrical Engineers (IEEE) 802.11 standard (such as 802.11n-2009 or 802.11ac), IEEE 802.16 (Wi-Max), Bluetooth, or the like.

Machine Examples

Figure 7:
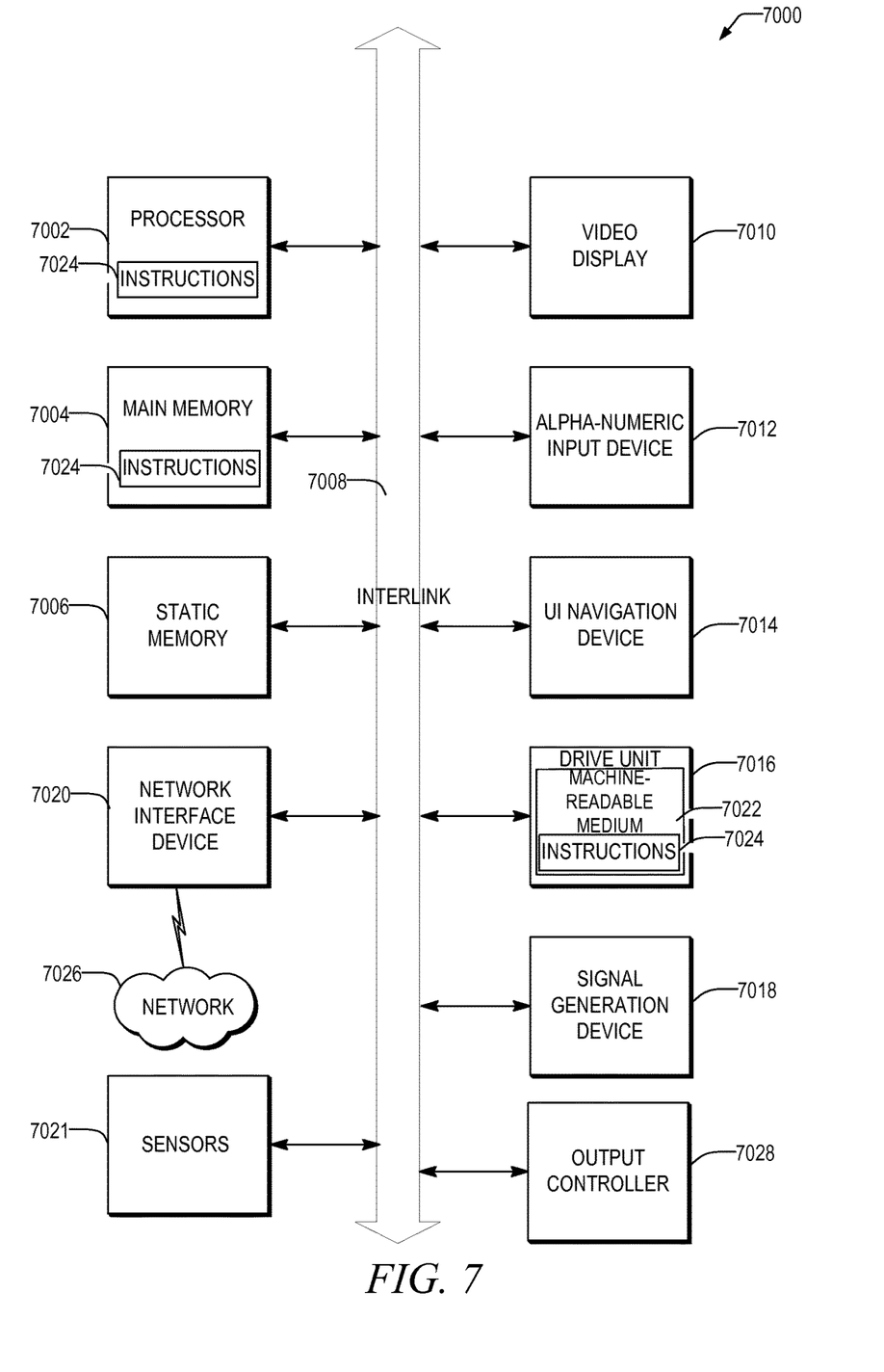
FIG. 7 is a block diagram illustrating an example of a machine upon which one or more embodiments may be implemented.

FIG. 7 illustrates a block diagram of an example machine 7000 upon which any one or more of the techniques (e.g., methodologies) discussed herein may be performed. For example, the machine may be configured to implement the modules of FIG. 6 or the methods shown in FIGS. 1 and 5. In alternative embodiments, the machine 7000 may operate as a standalone device or may be connected (e.g., networked) to other machines. In a networked deployment, the machine 7000 may operate in the capacity of a server machine, a client machine, or both in server-client network environments. In an example, the machine 7000 may act as a peer machine in peer-to-peer (P2P) (or other distributed) network environment. The machine 7000 may be a personal computer (PC), a tablet PC, a set-top box (STB), a personal digital assistant (PDA), a mobile telephone (e.g., a UE), a web appliance, a network router, switch or bridge, an eNodeB, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 7000 may include a hardware processor 7002 (e.g., a central processing unit (CPU), a graphics processing unit (GPU), a hardware processor core, or any combination thereof), a main memory 7004 and a static memory 7006, some or all of which may communicate with each other via an interlink (e.g., bus) 7008. The machine 7000 may further include a display unit 7010, an alphanumeric input device 7012 (e.g., a keyboard), and a user interface (UI) navigation device 7014 (e.g., a mouse). In an example, the display unit 7010, input device 7012 and UI navigation device 7014 may be a touch screen display. The machine 7000 may additionally include a storage device (e.g., drive unit) 7016, a signal generation device 7018 (e.g., a speaker), a network interface device 7020, and one or more sensors 7021, such as a global positioning system (GPS) sensor, compass, accelerometer, or other sensor. The machine 7000 may include an output controller 7028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 7016 may include a machine readable medium 7022 on which is stored one or more sets of data structures or instructions 7024 (e.g., software) embodying or utilized by any one or more of the techniques or functions described herein. The instructions 7024 may also reside, completely or at least partially, within the main memory 7004, within static memory 7006, or within the hardware processor 7002 during execution thereof by the machine 7000. In an example, one or any combination of the hardware processor 7002, the main memory 7004, the static memory 7006, or the storage device 7016 may constitute machine readable media.

While the machine readable medium 7022 is illustrated as a single medium, the term "machine readable medium" may include a single medium or multiple media (e.g., a centralized or distributed database, and/or associated caches and servers) configured to store the one or more instructions 7024.

The term "machine readable medium" may include any medium that is capable of storing, encoding, or carrying instructions for execution by the machine 7000 and that cause the machine 7000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 7024 may further be transmitted or received over a communications network 7026 using a transmission medium via the network interface device 7020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 7020 may include one or more physical jacks (e.g., Ethernet, coaxial, or phone jacks) or one or more antennas to connect to the communications network 7026. In an example, the network interface device 7020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 7000, and includes digital or analog communications signals or other intangible medium to facilitate communication of such software.

EXAMPLES

The following are additional examples.

Example 1 includes subject matter (such as a method, means for performing acts, machine readable medium including instructions) for reducing channel estimation overhead, comprising: at an eNodeB which provides a cell: determining an optimal signal subspace containing active UEs in the cell; transmitting beam formed reference signals to the optimal signal subspace; receiving a projected channel to the optimal signal subspace from at least one of the active UEs in the cell; and transforming a codebook and aligning codewords with a channel direction of the received projected channel.

In Example 2, the subject matter of Example 1 may optionally include wherein transmitting reference signals includes transmitting Channel State Information Reference Signals.

In Example 3, the subject matter of any one or more of examples 1-2 may optionally include wherein transmitting reference signals and receiving the projected channel is done using an Orthogonal Frequency Division Multiplexing protocol.

In Example 4, the subject matter of any one or more of examples 1-3 may optionally include wherein the optimal signal subspace has a dimension that is less than a full signal subspace.

In Example 5, the subject matter of any one or more of examples 1-4 may optionally include wherein transmitting reference signals comprises transmitting the reference signals to the active UEs in the cell.

In Example 6, the subject matter of any one or more of examples 1-5 may optionally include determining a change in the optimal signal subspace by scanning directions orthogonal to the optimal signal subspace.

In Example 7, the subject matter of any one or more of examples 1-6 may optionally include wherein determining the optimal signal subspace comprises estimating a channel covariance matrix at the end of a training phase.

Example 8 includes or may optionally be combined with the subject matter of any one of examples 1-7 to include subject matter (such as a device, apparatus, or machine such as an eNodeB) comprising: a signal subspace calculation module configured to: determine an optimal signal subspace containing active UEs in the cell; a reference signal output module configured to: transmit beam formed reference signals to the optimal signal subspace; an uplink reception module configured to: receive a projected channel to the optimal signal subspace from at least one of the active UEs in the cell; a transformation module configured to: transform a codebook and align codewords with a channel direction of the received projected channel.

In Example 9, the subject matter of any one or more of examples 1-8 may optionally include wherein the reference signal output module is configured to transmit reference signals by at least being configured to transmit Channel State Information Reference Signals.

In Example 10, the subject matter of any one or more of examples 1-9 may optionally include wherein the reference signal output module is configured to transmit the reference signals using at least an Orthogonal Frequency Division Multiplexing protocol.

In Example 11, the subject matter of any one or more of examples 1-10 may optionally include wherein the optimal signal subspace has a dimension that is less than a full signal subspace.

In Example 12, the subject matter of any one or more of examples 1-11 may optionally include wherein the reference signal output module is configured to transmit the reference signals transmitting reference signals by at least being configured to transmit the reference signals to the active UEs in the cell.

In Example 13, the subject matter of any one or more of examples 1-12 may optionally include wherein the optimal subspace calculation module is configured to determine a change in the optimal signal subspace by scanning directions orthogonal to the optimal signal subspace.

In Example 14, the subject matter of any one or more of examples 1-13 may optionally include wherein the optimal subspace calculation module is configured to determine the optimal signal subspace by at least being configured to estimate a channel covariance matrix at the end of a training phase.

Example 15 includes or may optionally be combined with the subject matter of any one of examples 1-14 to include subject matter (such as a device, apparatus, or machine such as a UE) comprising: a reference signal reception module configured to receive a beam formed reference signal sent from an eNodeB; an estimation module configured to estimate projected channel coefficients and direction; a transformation module configured to transform a codebook by a covariance matrix of the projected channel coefficients and direction; a quantization module configured to quantize the projected channel direction; a feedback module configured to: calculate a precoding matrix indicator and a channel quality indicator based upon the covariance matrix; and transmit the precoding matrix indicator, and a quantized covariance matrix calculated from the covariance matrix to the eNodeB.

In Example 16, the subject matter of any one or more of examples 1-15 may optionally include wherein the feedback module is configured to calculate the quantized covariance matrix by at least being configured to: calculate the quantized covariance matrix based upon the covariance matrix by scalar quantization of the elements of the covariance matrix.

In Example 17, the subject matter of any one or more of examples 1-16 may optionally include wherein the feedback module is configured to calculate the quantized covariance matrix based upon the covariance matrix by at least being configured to only quantize one of: the upper and the lower triangular elements of the matrix.

Example 18 includes or may optionally be combined with the subject matter of any one of examples 1-17 to include subject matter (such as a method, means for performing acts, machine readable medium including instructions) comprising: receiving a beam formed reference signal sent from an eNodeB; estimating projected channel coefficients and direction; transforming a codebook by a covariance matrix of the projected channel coefficients and direction; quantizing the projected channel direction; calculating a precoding matrix indicator and a channel quality indicator based upon the covariance matrix; and transmitting the precoding matrix indicator, and a quantized covariance matrix calculated from the covariance matrix to the eNodeB.

In Example 19, the subject matter of any one or more of examples 1-18 may optionally include receiving a beam formed reference signal sent from an eNodeB; estimating projected channel coefficients and direction; transforming a codebook by a covariance matrix of the projected channel coefficients and direction; quantizing the projected channel direction; calculating a precoding matrix indicator and a channel quality indicator based upon the covariance matrix; and transmitting the precoding matrix indicator, and a quantized covariance matrix calculated from the covariance matrix to the eNodeB.

What is claimed is:
1. A method for reducing channel estimation overhead, the method comprising:
  at an eNodeB that provides a cell:
    calculating a beamforming vector matrix using previously received channel state feedback for a plurality of active User Equipment(UE)s in the cell;
    determining an optimal signal subspace containing the plurality of active UEs in the cell using the beamforming vector matrix;
    transmitting a beam formed reference signal to the determined optimal signal subspace;
    determining that a UE of the plurality of active UEs in the cell has moved out of the optimal signal subspace;
    recalculating the beamforming vector matrix for the plurality of active UEs including the UE of the plurality of active UEs in the cell;
    transmitting a second beam formed reference signal to the UE of the plurality of active UEs in the cell using the recalculated beamforming reference matrix, the second beam formed reference signal being outside the optimal signal subspace;
    receiving a projected channel from the UE of the plurality of active UEs in the cell, the projected channel calculated by the UE of the plurality of active UEs in the cell based upon the second beam formed reference signal; and transforming a codebook and aligning codewords with a channel direction of the received projected channel.

2. The method of claim 1, wherein transmitting reference signals includes transmitting Channel State Information Reference Signals.

3. The method of claim 1, wherein transmitting reference signals and receiving the projected channel are done using an Orthogonal Frequency Division Multiplexing standard.

4. The method of claim 1, wherein the optimal signal subspace has a dimension that is less than a full signal subspace.

5. The method of claim 4, wherein transmitting reference signals comprises transmitting the reference signals to the plurality of active UEs in the cell.

6. The method of claim 1, comprising determining a change in the optimal signal subspace by scanning directions orthogonal to the optimal signal subspace.

7. The method of claim 1, wherein determining the optimal signal subspace comprises estimating a channel covariance matrix at the end of a training phase.

8. An eNodeB comprising:
a signal subspace calculation circuitry configured to:
calculate a beamforming vector matrix using previously received channel state feedback for a plurality of active User Equipment(UE)s in a cell;
determine an optimal signal subspace containing the plurality of active UEs in the cell using the beamforming vector matrix;
in response to determining that a UE of the plurality of active UEs in the cell has moved out of the optimal signal subspace, recalculating the beamforming vector matrix for the plurality of active UEs including the UE of the plurality of active UEs in the cell;
a reference signal output circuitry configured to:
transmit a beam formed reference signal to the optimal signal subspace;
transmit a second beam formed reference signal to the UE of the plurality of active UEs in the cell using the recalculated beamforming reference matrix, the second beam formed reference signal being outside the optimal signal subspace;
an uplink reception circuitry configured to:
receive a projected channel from the UE of the plurality of active UEs in the cell, the projected channel calculated by the UE of the plurality of active UEs in the cell based upon the second beam formed reference signal; and
a transformation circuitry configured to:
transform a codebook and align codewords with a channel direction of the received projected channel.

9. The eNodeB of claim 8, wherein the reference signal output circuitry is configured to transmit reference signals by at least being configured to transmit Channel State Information Reference Signals.

10. The eNodeB of claim 8, wherein the reference signal output circuitry is configured to transmit the reference signals using at least an Orthogonal Frequency Division Multiplexing standard.

11. The eNodeB of claim 8, wherein the optimal signal subspace has a dimension that is less than a full signal subspace.

12. The eNodeB of claim 11, wherein the reference signal output circuitry is configured to transmit the reference signals by at least being configured to transmit the reference signals to the plurality of active UEs in the cell.

13. The eNodeB of claim 8, wherein the signal subspace calculation circuitry is configured to determine a change in the optimal signal subspace by scanning directions orthogonal to the optimal signal subspace.

14. The eNodeB of claim 8, wherein the signal subspace calculation circuitry is configured to determine the optimal signal subspace by at least being configured to estimate a channel covariance matrix at the end of a training phase.

15. A non-transitory machine readable medium that stores instructions which when performed by a machine, cause the machine to perform operations comprising:
calculating a beamforming vector matrix using previously received channel state feedback for a plurality of active User Equipment(UE)s in the cell;
determining an optimal signal subspace containing the plurality of active UEs in the cell using the beamforming vector matrix;
transmitting a beam formed reference signal to the optimal signal subspace;
determining that a UE of the plurality of active UEs in the cell has moved out of the optimal signal subspace;
recalculating the beamforming vector matrix for the plurality of active UEs including the UE of the plurality of active UEs in the cell;
transmitting a second beam formed reference signal to the UE of the plurality of active UEs in the cell using the recalculated beamforming reference matrix, the second beam formed reference signal being outside the optimal signal subspace;
receiving a projected channel from the UE of the plurality of active UEs in the cell, the projected channel calculated by the UE of the plurality of active UEs the cell based upon the second beam formed reference signal; and
transforming a codebook and align codewords with a channel direction of the received projected channel.

16. A User Equipment (UE) comprising:
a reference signal reception circuitry configured to receive a beam formed reference signal sent from an eNodeB, the beam formed reference signal using a beamforming vector matrix, and the UE that is a member of a plurality of active UEs, the UE having moved outside of an optimal signal space of the eNodeB;
an estimation circuitry configured to estimate projected channel coefficients and direction based upon he received beam formed reference signal sent from the eNodeB;
a transformation circuitry configured to transform a codebook by a covariance matrix of the projected channel coefficients and direction;
a quantization circuitry configured to quantize the projected channel direction using the transformed codebook;
a feedback circuitry configured to:
calculate a precoding matrix indicator based upon the quantized projected channel direction; and
transmit the precoding matrix indicator, and a quantized covariance matrix calculated from the covariance matrix to the eNodeB.

17. The UE of claim 16, wherein the feedback circuitry is configured to calculate the quantized covariance matrix by at least being configured to:
calculate the quantized covariance matrix based upon the covariance matrix by scalar quantization of elements of the covariance matrix.

18. The UE of claim 17, wherein the feedback circuitry is configured to calculate the quantized covariance matrix based upon the covariance matrix by at least being configured to only quantize one of:

upper and the lower triangular elements of the matrix.

19. A method comprising:

receiving a beam formed reference signal sent from an eNodeB, the beam formed reference signal using a beamforming vector matrix, and a User Equipment (UE) that is a member of a plurality of active UEs in a cell, the UE having moved outside of an optimal signal space of the eNodeB;

estimating projected channel coefficients and direction based upon the beam formed reference signal sent from the eNodeB;

transforming a codebook by a covariance matrix of the projected channel coefficients and direction;

quantizing the projected channel direction using the transformed codebook;

calculating a precoding matrix indicator based upon the quantized projected channel direction; and transmitting the precoding matrix indicator, and a quantized covariance matrix calculated from the covariance matrix to the eNodeB.

20. A non-transitory machine readable medium that stores instructions which when performed by a machine, cause the machine to perform operations comprising:

receiving a beam formed reference signal sent from an eNodeB, the beam formed reference signal using a beamforming vector matrix, and a User Equipment (UE) that is a member of a plurality of active UEs in a cell, the UE having moved outside of an optimal signal space of the eNodeB;

estimating projected channel coefficients and direction based upon the received beam formed reference signal sent from the eNodeB;

transforming a codebook by a covariance matrix of the projected channel coefficients and direction;

quantizing the projected channel direction using the transformed codebook;

calculating a precoding matrix indicator based upon the quantized projected channel direction; and transmitting the precoding matrix indicator, and a quantized covariance matrix calculated from the covariance matrix to the eNodeB.

* * * * *